(12) United States Patent
Son et al.

(10) Patent No.: US 11,603,782 B2
(45) Date of Patent: Mar. 14, 2023

(54) HEAT EXCHANGER OF EXHAUST HEAT RECOVERY APPARATUS

(71) Applicant: Hanon Systems, Daejeon (KR)

(72) Inventors: Jung Wook Son, Daejeon (KR); Yang Woo Lee, Daejeon (KR); Hyeon Geun Chae, Daejeon (KR)

(73) Assignee: Hanon Systems, Daejeon (KR)

( * ) Notice: Subject to any disclaimer, the term of this patent is extended or adjusted under 35 U.S.C. 154(b) by 100 days.

(21) Appl. No.: 17/267,964

(22) PCT Filed: Feb. 15, 2019

(86) PCT No.: PCT/KR2019/001872
§ 371 (c)(1),
(2) Date: Feb. 11, 2021

(87) PCT Pub. No.: WO2020/045776
PCT Pub. Date: Mar. 5, 2020

(65) Prior Publication Data
US 2021/0215072 A1  Jul. 15, 2021

(30) Foreign Application Priority Data
Aug. 27, 2018  (KR) .................. 10-2018-0100501

(51) Int. Cl.
*F01N 3/02* (2006.01)
*F28D 21/00* (2006.01)

(52) U.S. Cl.
CPC ....... *F01N 3/0205* (2013.01); *F28D 21/0003* (2013.01)

(58) Field of Classification Search
CPC ............ F01N 3/0205; F01N 2260/024; F01N 2260/14; F01N 13/1872; F01N 2240/02; F01N 2240/20; F01N 2470/20; F01N 2470/22; F01N 13/08; F28D 21/0003; F28D 7/1684; F28F 1/40; F28F 2009/226
See application file for complete search history.

(56) References Cited

U.S. PATENT DOCUMENTS

| 2003/0010479 | A1* | 1/2003 | Hayashi | F02M 26/32 165/157 |
| 2007/0056721 | A1* | 3/2007 | Usui | F28D 7/1684 165/183 |
| 2009/0025916 | A1* | 1/2009 | Meshenky | F28D 9/0037 165/165 |
| 2010/0044019 | A1* | 2/2010 | Maeda | F28F 13/02 165/151 |

(Continued)

FOREIGN PATENT DOCUMENTS

| CN | 1749684 A | * | 3/2006 | ............ F28D 7/1684 |
| CN | 1945193 A | * | 4/2007 | ............ F02M 26/32 |

(Continued)

*Primary Examiner* — Hung Q Nguyen
(74) *Attorney, Agent, or Firm* — Norton Rose Fulbright US LLP; James R. Crawford

(57) ABSTRACT

The present invention relates to a heat exchanger of an exhaust heat recovery apparatus having a simple structure which is configured such that exhaust gas is evenly distributed, thereby preventing a boiling phenomenon wherein coolant water is boiling, and improving efficiency of heat exchange and durability of the apparatus.

17 Claims, 11 Drawing Sheets

(56) References Cited

U.S. PATENT DOCUMENTS

| | | | | |
|---|---|---|---|---|
| 2011/0247318 A1* | 10/2011 | Kuroyanagi | ............ | F28F 9/001 60/278 |
| 2016/0305713 A1* | 10/2016 | Grande Fernández | ...................... | F28F 9/0236 |
| 2017/0152816 A1* | 6/2017 | Ohrem | ................... | F02M 26/32 |
| 2018/0291844 A1* | 10/2018 | Lee | ........................ | F02M 26/27 |

FOREIGN PATENT DOCUMENTS

| | | | | | |
|---|---|---|---|---|---|
| CN | 104205384 | A | * | 12/2014 | ............ F01N 13/18 |
| DE | 19721132 | A1 | * | 11/1997 | ............ F02M 26/32 |
| DE | 19957379 | A1 | * | 6/2000 | ............ F02M 26/32 |
| DE | 69912335 | T2 | * | 7/2004 | |
| DE | 102005045103 | B3 | * | 12/2006 | ........... F01N 3/0205 |
| DE | 102006005362 | A1 | * | 8/2007 | ............ F02M 26/29 |
| DE | 102009047391 | A1 | * | 6/2011 | ........... F28D 7/1638 |
| DE | 102010008176 | A1 | * | 8/2011 | ......... F02B 29/0462 |
| DE | 112016004891 | T5 | * | 7/2018 | ............ F02M 26/32 |
| EP | 1153690 | A1 | * | 11/2001 | ........... B23K 1/0012 |
| EP | 1376043 | A2 | * | 1/2004 | ............ F02M 26/32 |
| EP | 1626238 | A1 | * | 2/2006 | ............ F02M 26/12 |
| EP | 1657512 | A1 | * | 5/2006 | ........... F28D 7/1684 |
| JP | H0849534 | A | * | 2/1996 | |
| JP | 2001-027157 | A | | 1/2001 | |
| JP | 2003201923 | A | * | 7/2003 | ............... F01N 5/02 |
| JP | 2005273512 | A | * | 10/2005 | ............... F28D 7/16 |
| JP | 2007232355 | A | * | 9/2007 | ............ F02M 26/25 |
| JP | 2008145024 | A | * | 6/2008 | ........... F28D 7/1684 |
| JP | 2017516975 | A | * | 6/2017 | |
| JP | 2018-013074 | A | | 1/2018 | |
| KR | 20060113741 | A | * | 1/2006 | |
| KR | 100814071 | B1 | * | 3/2008 | |
| KR | 100823654 | B1 | * | 4/2008 | |
| KR | 20090064077 | A | * | 6/2009 | |
| KR | 101569829 | B1 | * | 11/2015 | |
| KR | 101569829 | B1 | | 11/2015 | |
| KR | 101637981 | B1 | | 7/2016 | |
| KR | 20170085453 | A | * | 7/2017 | |
| KR | 10-2017-0118469 | A | | 10/2017 | |
| KR | 20180067390 | A | | 6/2018 | |
| WO | WO-2004065876 | A1 | * | 8/2004 | ........... F28D 9/0025 |
| WO | WO-2006040122 | A1 | * | 4/2006 | ............... F28D 9/00 |
| WO | WO-2006080152 | A1 | * | 8/2006 | ............ F02M 26/32 |
| WO | WO-2007009713 | A1 | * | 1/2007 | ............ F02M 26/11 |
| WO | WO-2007104580 | A2 | * | 9/2007 | ............ F02M 26/25 |
| WO | WO-2008058734 | A1 | * | 5/2008 | ......... F02B 29/0418 |
| WO | WO-2008105576 | A1 | * | 9/2008 | ............ F02M 26/32 |
| WO | WO-2017073895 | A1 | * | 5/2017 | ............ F02M 26/32 |

\* cited by examiner

HEAT EXCHANGER OF EXHAUST HEAT RECOVERY APPARATUS

This application is a national phase under 35 U.S.C. § 371 of International Application No. PCT/KR2019/001872 filed Feb. 15, 2019, which claims the benefit of priority from Korean Patent Application No. 10-2018-0100501 filed Aug. 27, 2018. The entire contents of these applications are incorporated herein by reference in their entirety.

TECHNICAL FIELD

The present invention relates to a heat exchanger of an exhaust heat recovery apparatus.

BACKGROUND ART

An engine of a vehicle generates heat energy during combustion. In general, the engine is cooled by coolant to prevent heat energy from being generated excessively. Although the engine is cooled in the above-described manner, some of the heat energy generated during combustion sometimes may fail to be discharged through the coolant and thereby the engine may overheat.

When the coolant has a very low temperature, there may be an increase in loss of combustion energy in the engine, resulting in an adverse effect on the operation of the engine, that is, the combustion. In particular, in a hybrid vehicle, the temperature of the coolant is maintained at a predetermined level or higher to reduce exhaust gas emission that occurs when the coolant for the engine is cold, but the engine is not operated and the coolant is not heated while the vehicle is driven with an electric motor, and as a result, engine fuel is consumed to heat the coolant even while power is not required. This phenomenon is particularly aggravated in winter, resulting in a problem that fuel efficiency deteriorates.

In order to solve this problem, an exhaust heat recovery apparatus has been used to utilize the heat energy discarded as exhaust gas through an exhaust pipe, after the combustion in the engine, for heating the coolant.

In a conventional exhaust gas recovery apparatus including a plurality of coolant flow paths and a plurality of exhaust gas flow paths formed adjacent to each other to exchange heat, exhaust gas may not be uniformly distributed into the plurality of flow paths, resulting in a deterioration in heat exchange efficiency, and excessive heat and pressure may be applied to a specific flow path when the exhaust gas is excessively guided to the specific flow path, resulting in a boiling phenomenon in which the coolant boils and a deformation of a member constituting the flow path.

In order to solve this problem, various types of exhaust heat recovery apparatuses have currently been developed and introduced. However, most of the exhaust heat recovery apparatuses have a problem in that the apparatuses are complicated and the exhaust gas is not uniformly distributed well.

DISCLOSURE

Technical Problem

An object of the present invention is to provide a heat exchanger of an exhaust heat recovery apparatus capable of uniformly distributing exhaust gas to prevent a boiling phenomenon in which coolant boils and improve the heat exchange efficiency and the durability of the apparatus, while having a simple structure.

Technical Solution

In one general aspect, a heat exchanger of an exhaust heat recovery apparatus includes: a housing extending in one direction, with both sides thereof being opened to allow exhaust gas to be introduced from one side thereof and discharged to the other side thereof; at least two tube parts 200 spaced apart from each other at a predetermined distance in a height direction while being accommodated inside the housing to form a flow path in a direction in which the housing extends to allow the exhaust gas introduced from the one side of the housing to pass therethrough; an exhaust gas inlet 300 formed in a lower portion of the one side of the housing; an exhaust gas outlet 400 formed in a lower portion of the other side of the housing and having a smaller area than the exhaust gas inlet 300; a coolant inlet 500 formed in a side surface of the housing 100 to introduce coolant between the tube parts 200; and a coolant outlet 600 formed in the side surface of the housing 100 to discharge the coolant introduced between the tube parts 200.

The exhaust gas inlet 300 may be cut at one side thereof, and the exhaust gas outlet 400 may have an end portion formed at the other side thereof to be closed.

The heat exchanger of the exhaust heat recovery apparatus may further include a baffle 700 fixing the plurality of tube parts 200 to be spaced apart from each other and extending a flow path for the coolant introduced through the coolant inlet 500 and discharged through the coolant outlet 600.

The baffle 700 may include: a support portion 710 extending in one direction to be disposed in the height direction of the housing 100; and a plurality of extension portions 720 extending in a direction perpendicular to the direction in which the support portion 710 extends, while being spaced apart from each other at a predetermined distance along the support portion 710, to be inserted into spaces between the tube parts 200.

A parallel distance from the exhaust gas inlet 300 to a tube part 200 farthest away therefrom may be no more than 1.5 times a one-side width of the exhaust gas inlet 300.

The exhaust gas inlet 300 may have an area that is no less than 99% and no more than 105% of a sum of inlet end areas of the plurality of tube parts 200.

The exhaust gas outlet 400 may have an area that is 70% or more of that of the exhaust gas inlet 300.

The coolant inlet 500 may be formed at a lower position than the coolant outlet 600 on the basis of the gravity direction.

A coolant flow path formed by a space between the tube parts 200 adjacent to each other and a coolant flow path formed by a space between the housing 100 and the tube part 200 may be identical to each other in height.

Each of the coolant flow paths may have a height that is no less than 95% and no more than 100% of a value obtained by dividing an inner diameter of the coolant inlet 500 by a total number of coolant flow paths.

Each of the tube parts 200 may include a plurality of fins 210 spaced apart from each other at a predetermined distance in a width direction of the housing 100, with first waves 211 curved in one direction and second waves 212 curved in the opposite direction being repeatedly formed, while extending in the direction in which the housing 100 extends and in the height direction.

The number of repetitions of first waves 211 or second waves 212 may be 13 to 15 per 100 mm in length of each of the fins 210.

The fins 210 may extend to be 6 to 8 mm in the height direction.

A parallel distance from end points of the first waves 211 to end points of the second waves 212 of another adjacent fin may be 0.20 to 0.25 mm.

The first waves 211 may have a curvature radius of 3.8 to 4.2 mm, and the second waves 212 may have a curvature radius of 2.5 to 2.9 mm.

The housing 100 may include a first housing 110 and a second housing 120 that are assembled together.

The first housing 110 and the second housing 120 may be assembled together by inserting an end of the second housing 120 into an end of the first housing 110, and the support portion 710 may be located at a position where the ends of the first housing 110 and the second housing 120 overlap each other to contact an inner surface of the second housing 120.

In another general aspect, an exhaust heat recovery apparatus includes: the heat exchanger 10 of the exhaust heat recovery apparatus; an outer housing 40 in which the heat exchanger 10 of the exhaust heat recovery apparatus is accommodated; and an exhaust gas controller 50 installed inside the outer housing to control the exhaust gas to be introduced into or blocked from the heat exchanger of the exhaust heat recovery apparatus depending on an operation mode.

Advantageous Effects

In the heat exchanger of the exhaust heat recovery apparatus according to various exemplary embodiments of the present invention as described above, the one-side end of the exhaust gas inlet, through which exhaust gas is introduced, is opened such that the outer housing of the exhaust heat recovery apparatus serves to guide the exhaust gas toward the tube parts. Accordingly, the exhaust gas can be uniformly guided toward the respective tube parts, thereby preventing a deformation of a specific tube part due to excessive heat and pressure applied to the specific tube part and a boiling phenomenon in which the coolant boils due to excessive heat exchange.

Further, according to the present invention, the efficiency of the heat exchanger can be maximized, while preventing the boiling phenomenon in which the coolant boils, based on the various numerical values as described above.

In addition, according to the present invention, the housing includes the first housing and the second housing that may be assembled together, and the first housing and the second housing and the support portion of the baffle contact one another at a center portion of the heat exchanger. Accordingly, the heat exchanger can be prevented from being deformed at the center portion thereof.

BEST MODE

Hereinafter, a heat exchanger of an exhaust heat recovery apparatus according to a preferred exemplary embodiment of the present invention will be described in detail with reference to the accompanying drawings.

First Exemplary Embodiment

Figure 1:
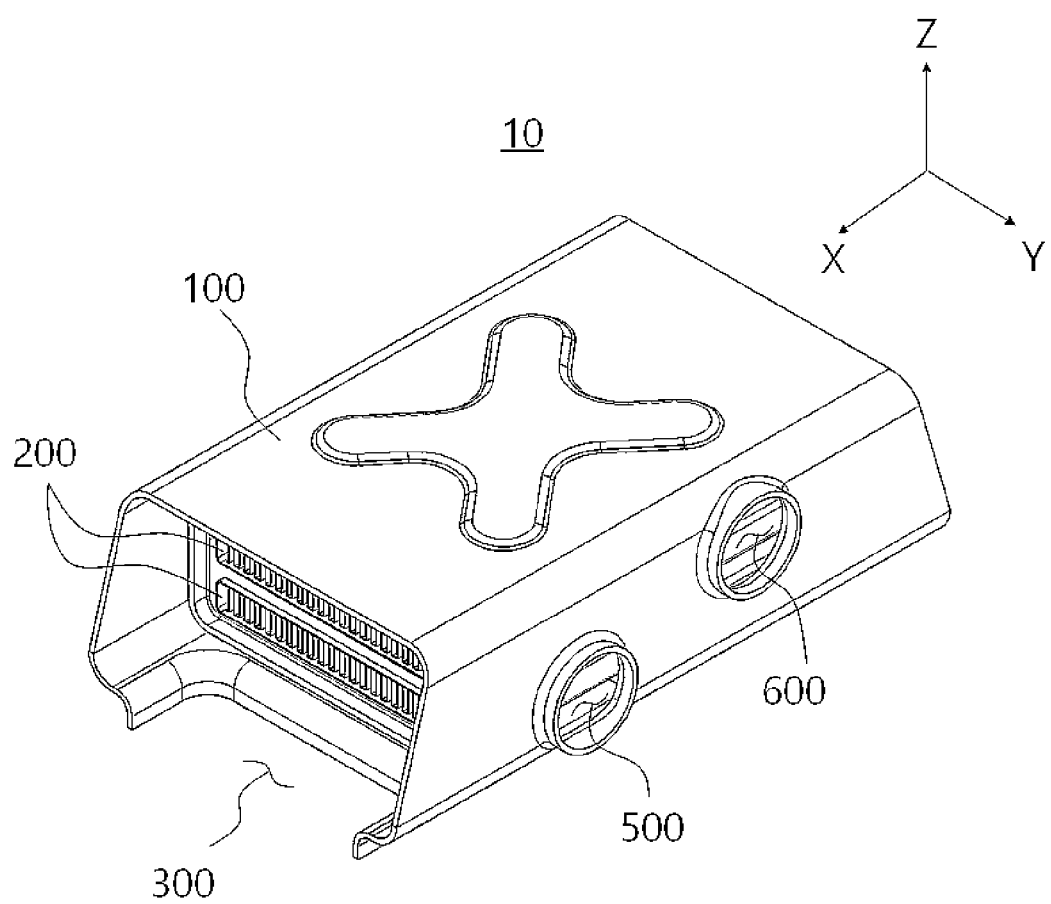
FIGS. 1 and 2 are perspective views illustrating a heat exchanger of the exhaust heat recovery apparatus according to a first exemplary embodiment of the present invention viewed from different angles.
Figure 2:
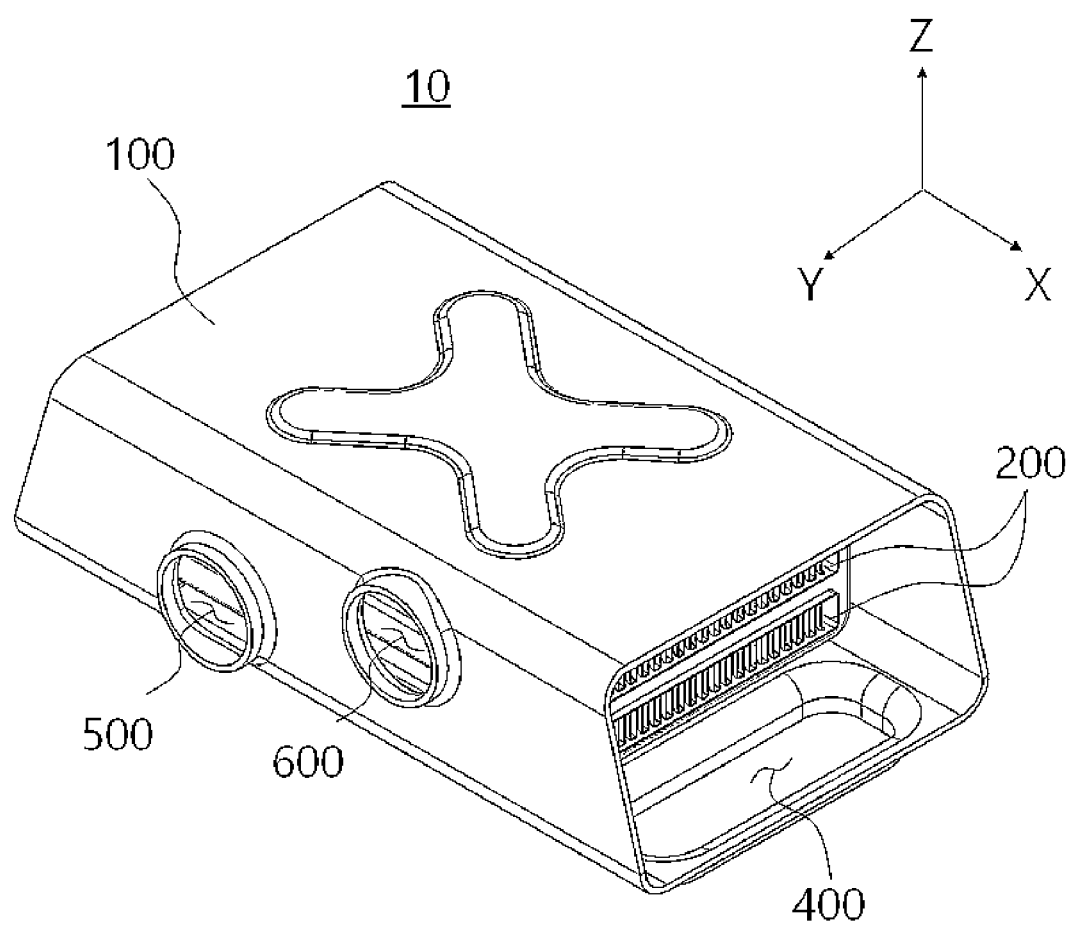

FIG. 1 illustrates a heat exchanger 10 of the exhaust heat recovery apparatus according to a first exemplary embodiment of the present invention, and FIG. 2 illustrates the heat exchanger 10 of the exhaust heat recovery apparatus according to the first exemplary embodiment of the present invention viewed from a different angle from FIG. 1.

As illustrated in FIGS. 1 and 2, three virtual X, Y, and Z axes perpendicular to each other are set in drawings for convenience of explanation, and the set three axes may also be shown in other drawings for explaining the present invention.

As illustrated in FIGS. 1 and 2, the heat exchanger 10 of the exhaust heat recovery apparatus according to the first exemplary embodiment of the present invention may include a housing 100, a tube part 200, an exhaust gas inlet 300, an exhaust gas outlet 400, a coolant inlet 500, and a coolant outlet 600.

As illustrated in FIGS. 1 and 2, the housing 100 extends in an X-axis direction, with both X-axis ends thereof being opened to allow exhaust gas to be introduced and discharged through both opened sides of the housing 100, respectively, and the tube part 200 is accommodated inside the housing 100.

As illustrated in FIGS. 1 and 2, among the above-described components included in the exhaust heat recovery apparatus according to the first exemplary embodiment of the present invention, the exhaust gas inlet 300, the exhaust gas outlet 400, the coolant inlet 500, and the coolant outlet 600 are formed in the housing 100.

Figure 3:
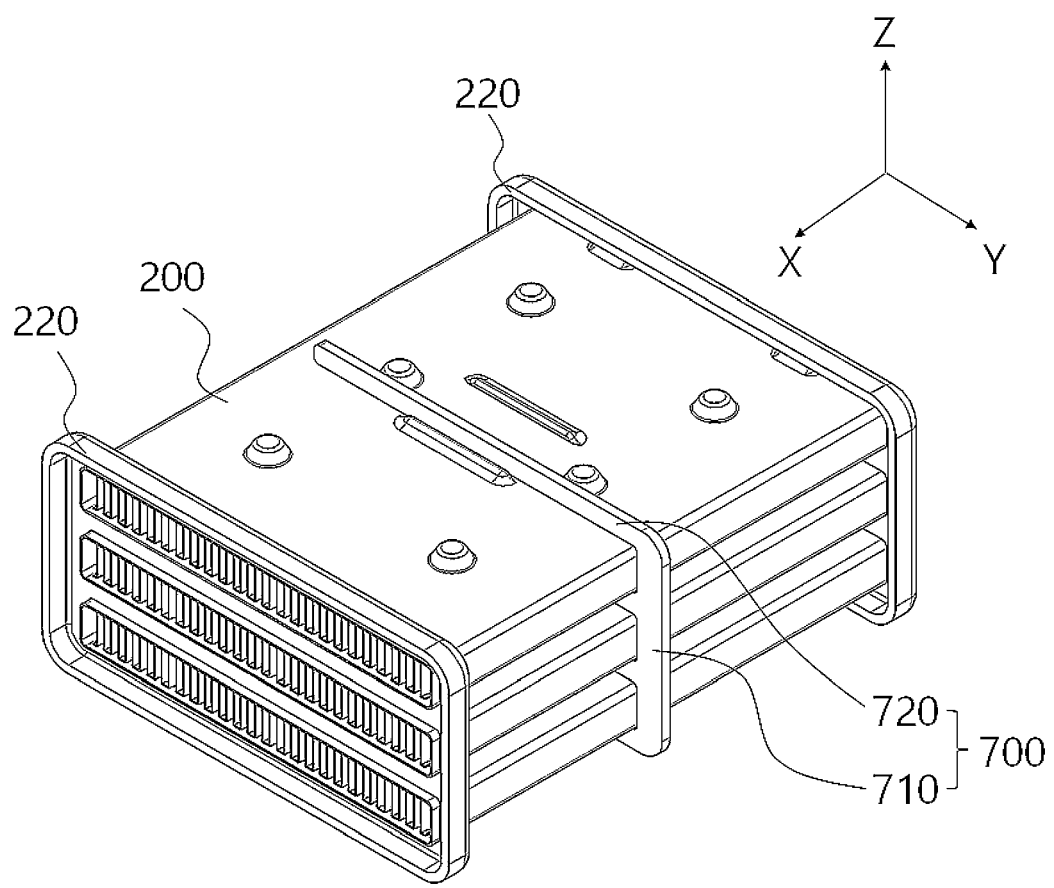
FIG. 3 is a perspective view illustrating only tube parts 200 and a baffle 700 in the heat exchanger of the exhaust heat recovery apparatus according to the first exemplary embodiment of the present invention.

FIG. 3 illustrates a state where the housing 100 and several components (the exhaust gas inlet 300, the exhaust gas outlet 400, the coolant inlet 500, and the coolant outlet 600) formed in the housing 100 are excluded among the components illustrated in FIGS. 1 and 2.

As illustrated in FIGS. 1 to 3, the tube part 200 is a part accommodated inside the housing 100 to form a flow path through which the exhaust gas introduced into the housing 100 passes. The exhaust gas flow path formed by the tube part 200 is formed in the X-axis direction, that is, in the same direction as the housing 100 extends, and a plurality of tube parts 200 are formed to be spaced apart from each other at a predetermined distance in a height direction of the housing 100, that is, in a Z-axis direction.

A space between the tube parts 200 spaced apart from each other at the predetermined distance as illustrated in FIG. 3 is a coolant flow path. On the basis of the X-axis direction, the coolant is introduced from the left side of the coolant flow path and discharged to the right side of the coolant flow path.

The coolant is heated by exchanging heat with the exhaust gas passing through adjacent tube parts 200 while being introduced into and discharged from the space between the tube parts 200, thereby obtaining heat for heating during an initial operation of an engine in winter.

As illustrated in FIG. 3, connectors 220 are inserted into both ends of the tube parts 200. The connectors 220, which are equipment for the plurality of tube parts 200 to be spaced apart from each other at the predetermined distance in the Z-axis direction, while being stably accommodated inside housing 100, may have insertion holes formed therein to correspond to both ends of the tube parts 200 to allow both ends of the tube parts 200 to be inserted thereinto.

As illustrated in FIG. 3, the heat exchanger of the exhaust heat recovery apparatus according to the first exemplary embodiment of the present invention may further include a baffle 700 inserted into the middle of the tube parts 200.

The baffle 700 is provided not only for the plurality of tube parts 200 to be spaced apart from each other at the predetermined distance in the Z-axis direction, like the connectors 220, but also to set a flow path allowing the coolant to be introduced from the left side thereof and discharged to the right side thereof on the basis of the X-axis direction. As illustrated in FIG. 3, the baffle 700 may include a support portion 710 and an extension portion 720.

As illustrated in FIG. 3, the support portion 710 is a member extending in the Z-axis direction and may be disposed to contact side surfaces of the plurality of tube parts 200.

As illustrated in FIG. 3, a plurality of extension portions 720 extend in a Y-axis direction, which is a direction perpendicular to the direction in which the support portion 710 extends, while being spaced apart from each other at a predetermined distance along the support portion 710.

Since the extension portions 720 are spaced apart from each other at the predetermined distance along the direction in which the support portion 710 extends, spaces are formed between adjacent extension portions 720. The side surfaces of the tube parts 200 are inserted into the spaces between the adjacent extension portions 720, thereby fixing the plurality of tube parts 200 to be spaced apart from each other at the predetermined distance in the height direction.

An extending length of the extension portion 720 is shorter than a Y-axis length of the tube part 200. This is for the extension portion 720 to set and expand the coolant flow path so that the coolant and the exhaust gas may exchange heat with each other for a longer period of time. That is, the extension portion 720 makes it possible to form a coolant introducing space and a coolant discharging space on the left side and on the right side, respectively, on the basis of the X-axis direction, so that the coolant may flow in a "U" shape on and under the tube part 200.

Figure 4:
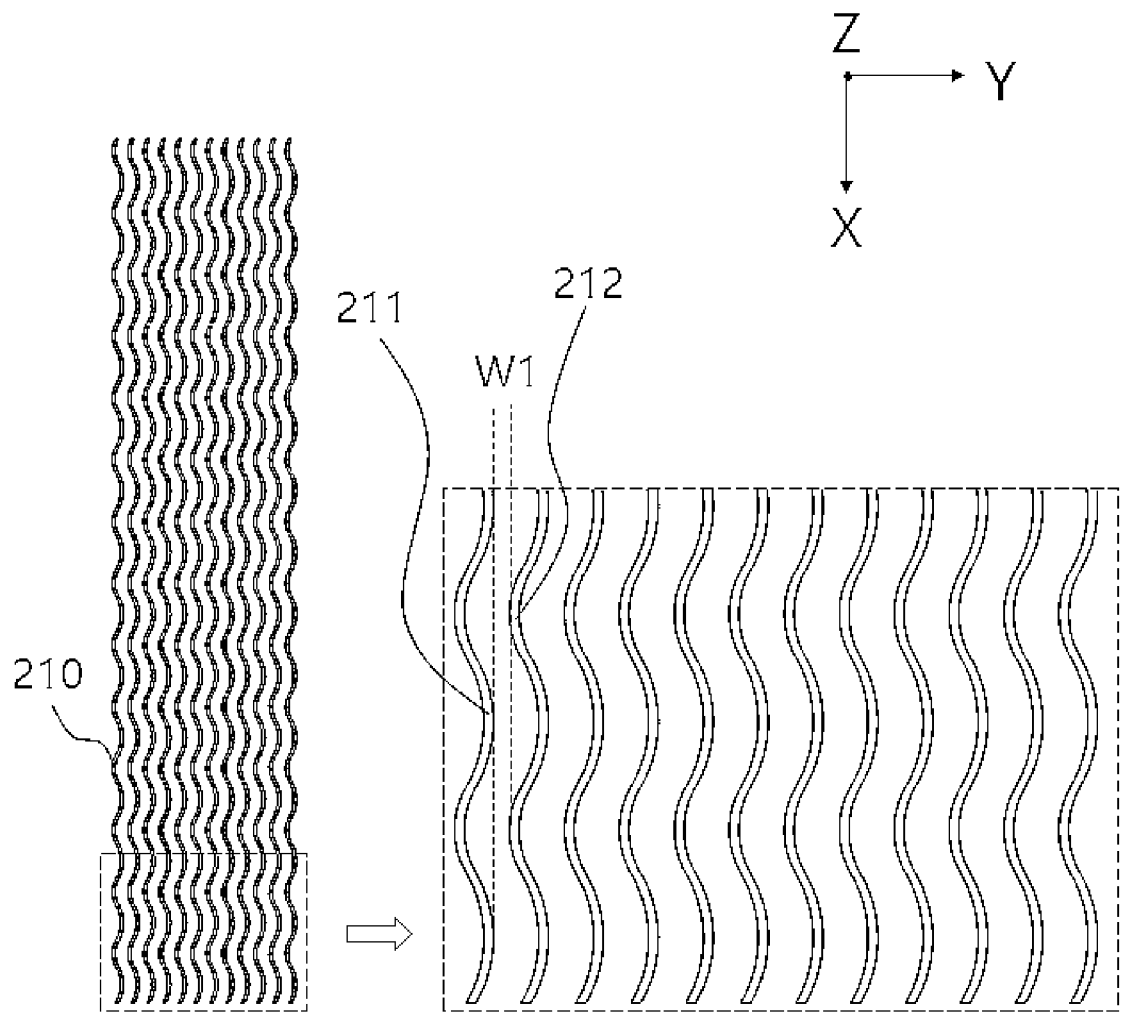
FIG. 4 is a schematic cross-sectional view of fins 210 of the tube parts 200 in the heat exchanger of the exhaust heat recovery apparatus according to the first exemplary embodiment of the present invention.

FIG. 4 illustrates the flow path inside each of the tube parts 200 viewed from above.

As illustrated in FIG. 4, each of the tube parts 200 may include a plurality of fins 210 spaced apart from each other at a predetermined distance in the Y-axis direction.

As illustrated in FIG. 4, each of the fins 210 may include a first wave 211 and a second wave 212 bent in different directions (different from each other in the center of curvature).

The first wave 211 and the second wave 212 are provided to prolong a period of time for which the exhaust gas passes through the inside of the tube part 200, thereby increasing heat exchange efficiency.

The first wave 211 and the second wave 212 illustrated in FIG. 4 may be different from each other in curvature radius. Particularly, the first wave 211 may have a curvature radius R1 of 3.8 to 4.2 mm, and the second wave 212 may have a curvature radius R2 of 2.5 to 2.9 mm. More particularly, R1 may be 4.0 mm and R2 may be 2.7 mm.

The number of repetitions of first waves 211 and second waves 212 formed on each of the fins 210 illustrated in FIG. 4 may be from 13 to 15 per 100 mm in length of each of the fins 210, and the number of repetitions of first waves 211 and second waves 212 per 100 mm in length of each of the fins 210 in the present exemplary embodiment may be a total of 14.

Since 13 to 15 first waves 211 and second wave 212 are repeatedly formed per 100 mm in length of each of the fins 210, a length of one cycle (a first wave and a second wave) may be 6.6 to 7.6 mm, and the length of one cycle in the present exemplary embodiment may be about 7 mm.

A Y-axis distance W1 (parallel distance) from end points of the first waves 211 to end points of the second waves 212 as illustrated in FIG. 4 may be about 0.20 to 0.25 mm, and it may be 0.23 mm in the present exemplary embodiment. An extending length of each of the fins 210 in the Z axis direction may be 6 to 8 mm, and the length in the present exemplary embodiment may be 7 mm.

The reason for specifically limiting the numerical values of the tube part 200 as described above is to improve the flow and the heat exchange efficiency of the exhaust gas inside the tube part 200.

As illustrated in FIG. 1, the exhaust gas inlet 300 is a part formed in one side of the housing 100 to allow the exhaust gas to be introduced.

As illustrated in FIG. 1, one end of the exhaust gas inlet 300 is opened to allow the exhaust gas introduced through the exhaust gas inlet 300 to be uniformly distributed to the plurality of tube parts 200.

As illustrated in FIG. 1, the exhaust gas outlet 400 is a part formed in the other side of the housing 100 to discharge the exhaust gas that has been heat-exchanged while passing through the inside of the housing 100, more particularly the inside of the tube parts 200 accommodated in the housing 100, via the exhaust gas inlet 300. The exhaust gas inlet 300 and the exhaust gas outlet 400 will be described in detail later.

As illustrated in FIGS. 1 and 2, the coolant inlet 500 and the coolant outlet 600 may be formed in an identical side surface of the housing 100, and pipes may be coupled to the coolant inlet 500 and the coolant outlet 600 to introduce and discharge the coolant, respectively.

As illustrated in FIGS. 1 and 2, the coolant inlet 500 may be formed to be lower than the coolant outlet 600 on the basis of the Z-axis direction, which is the direction of gravity, to prevent a boiling phenomenon, in which the coolant boils after air is entirely removed from the coolant flow path, causing an increase in internal pressure resulting in damage to the heat exchanger. In more detail, in the heat exchanger of the exhaust heat recovery apparatus according to the present invention, heat is exchanged between the exhaust gas and the coolant, and the temperature of the coolant starts to rise after the coolant is introduced into the coolant inlet 500 and is highest when the coolant is discharged to the coolant outlet 600. Thus, it is more likely that the boiling phenomenon may occur as the coolant moves further toward the coolant outlet 600. In general, high-temperature fluid moves upwardly, and thus, the coolant outlet 600, at which it is highly likely that the boiling phenomenon may occur, is formed at a higher position than the coolant inlet 500.

Figure 5:
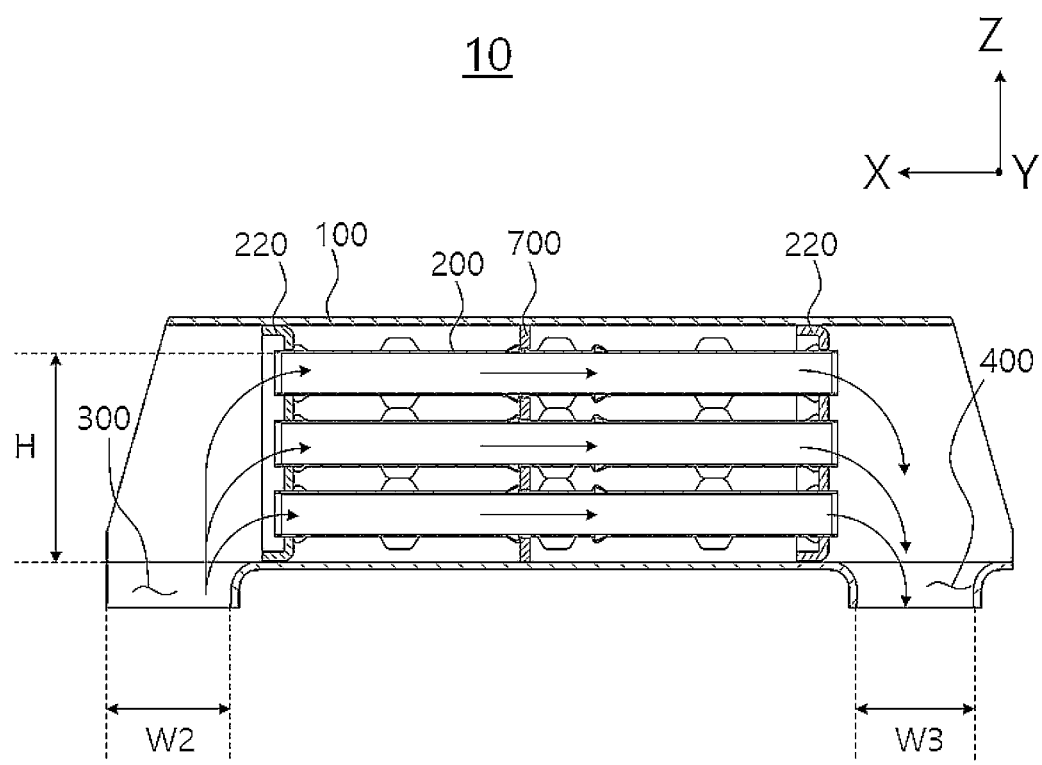
FIGS. 5 and 6 are cross-sectional views of the heat exchanger of the exhaust heat recovery apparatus according to the first exemplary embodiment of the present invention.

FIG. 5 illustrates a cross section of the heat exchanger 10 of the exhaust heat recovery apparatus according to the first exemplary embodiment of the present invention illustrated in FIG. 1.

As illustrated in FIG. 5, the exhaust gas introduced through the exhaust gas inlet 300 is guided into the plurality of the tube part 200. Although not shown in the drawing, an inner surface of an outer housing in the exhaust heat recovery apparatus including the heat exchanger illustrated in FIG. 5 serves as a guide partition guiding the exhaust gas introduced through the exhaust gas inlet 300 to the tube parts 200, and one end of the exhaust gas inlet 300 is opened, thereby more uniformly distributing the exhaust gas.

On the other hand, since the exhaust gas outlet 400 is a part for discharging the heat-exchanged exhaust gas, which has already been distributed, through the other ends of the tube parts 200, the other end of the exhaust gas outlet 400 is closed, while the inner wall of the outer housing of the exhaust heat recovery apparatus also serves as a guide partition when the exhaust gas having passed through the tube parts 200 flows into the exhaust gas outlet 400. That is, according to the present invention, the exhaust gas inlet 300 and the exhaust gas outlet 400 are asymmetric with different shapes.

Referring to FIG. 5, a parallel distance H from the exhaust gas inlet 300 to a tube part 200 farthest away therefrom may be no more than 1.5 times an X-axis length of the exhaust gas inlet 300, that is, a one-side width W2. This is to more uniformly distribute the exhaust gas introduced through the exhaust gas inlet 300 to the tube parts 200.

The exhaust gas outlet 400 illustrated in FIG. 2 may have an area that is 70% or more of that of the exhaust gas inlet 300 illustrated in FIG. 1. Assuming that the exhaust gas inlet 300 and the exhaust gas outlet 400 have the same length in the Y-axis direction, the exhaust gas outlet 400 illustrated in FIG. 5 may have an X-axis length W3 that is no less than a value obtained by multiplying the X-axis length W2 of the exhaust gas inlet 300 by 0.7.

The exhaust gas inlet 300 may have an area that is no less than 99% and no more than 105% of a sum of inlet end areas of the plurality of tube parts 200.

Figure 6:
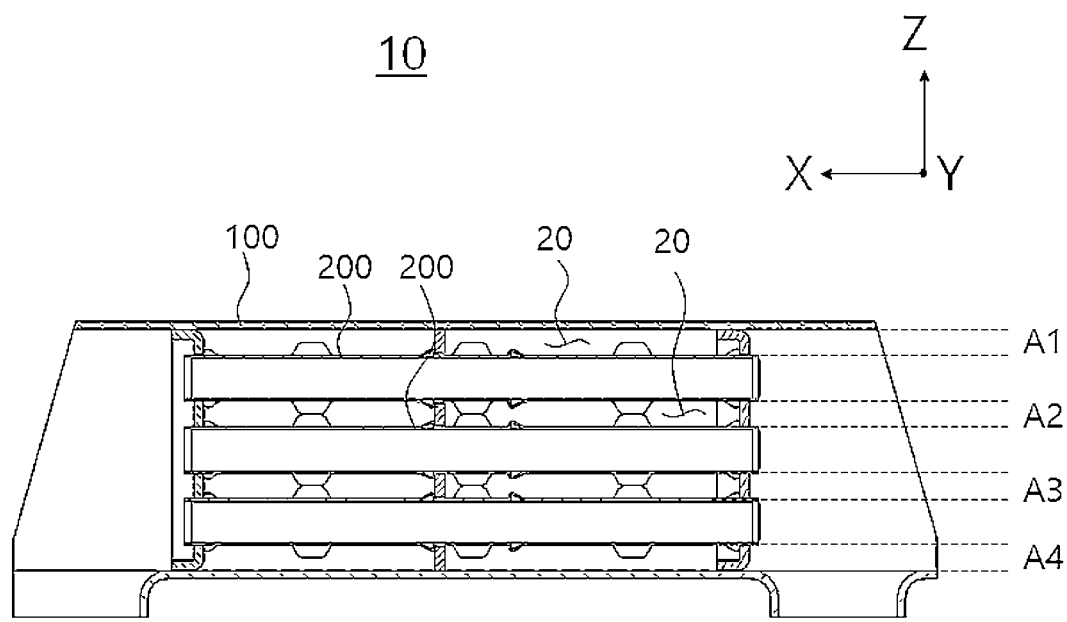

FIG. 6 illustrates a cross section of the heat exchanger 10 of the exhaust heat recovery apparatus according to the first exemplary embodiment of the present invention illustrated in FIG. 1, like FIG. 5, but for explaining a coolant flow path 20 formed between the housing 100 and the tube part 200 and another coolant flow path 20 formed between the adjacent tube parts 200.

As illustrated in FIG. 6, the coolant flow path 20 formed between the housing 100 and the tube part 200 and the coolant flow path 20 formed between the adjacent tube parts 200 are identical to each other in that the coolant flows, and in the height, in other words Z-axis length, of the respective coolant flow path 20. That is, the coolant flow paths 20 illustrated in FIG. 6 have respective lengths A1 to A4 identical to each other.

Each of the coolant flow paths 20 illustrated in FIG. 6 may have a Y-axis length that is no less than 95% and no more than 100% of a value obtained by dividing an inner diameter of the coolant inlet 500 by a total number of coolant flow paths 20, that is 4. This is because the efficiency of the heat exchanger decreases when the Y-axis length of the coolant flow path 20 exceeds 100% of the value obtained by dividing the inner diameter of the coolant inlet 500 by 4, and the efficiency of the heat exchanger rapidly decreases when the Y-axis length of the coolant flow path 20 is less than 95%, more particularly 60%, of the value obtained by dividing the inner diameter of the coolant inlet 500 by 4, which causes the boiling phenomenon, in which the coolant boils, or a severe flow resistance.

Second Exemplary Embodiment

Hereinafter, a heat exchanger of an exhaust heat recovery apparatus according to a second exemplary embodiment of the present invention will be described in detail with reference to the accompanying drawings.

The difference of the heat exchanger of the exhaust heat recovery apparatus according to the second exemplary embodiment of the present invention from that according to the first exemplary embodiment of the present invention is the housing 100. The other parts, excluding the housing 100 and the components associated therewith, are identical between the first exemplary embodiment and the second exemplary embodiment, and therefore, the description thereof is omitted.

Figure 7:
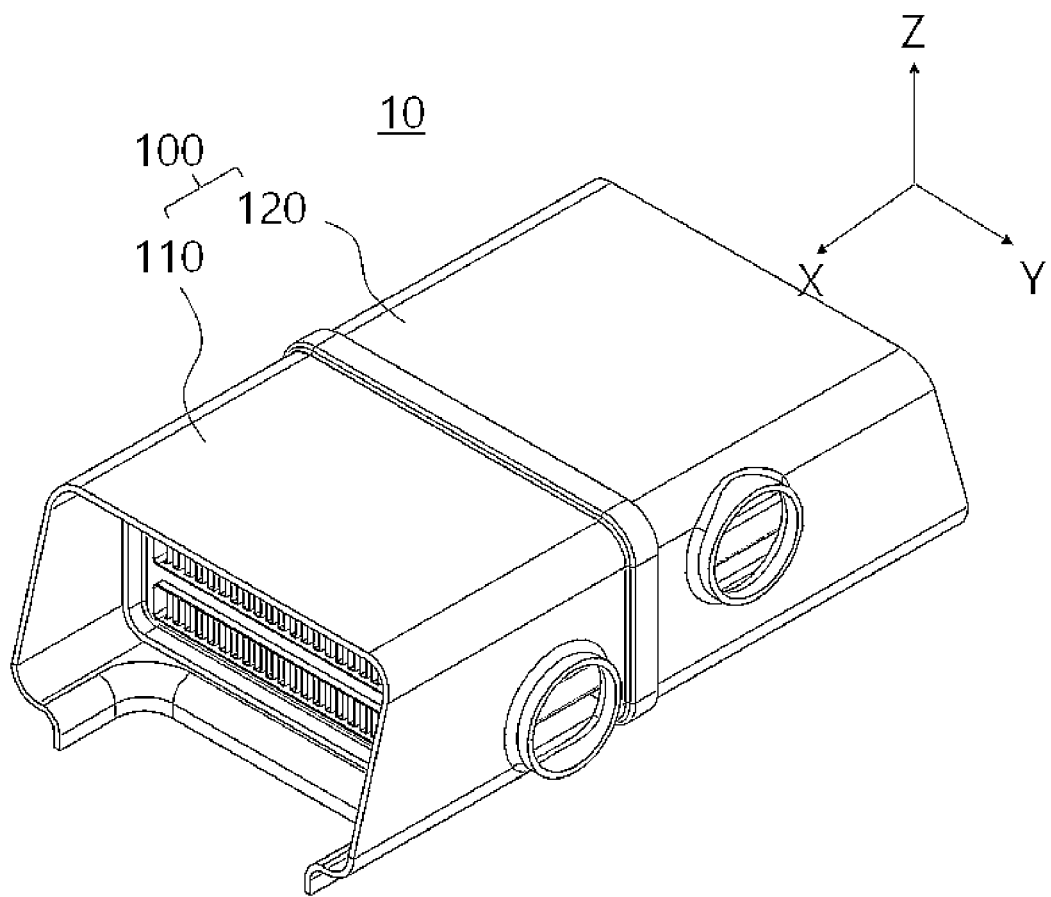
FIG. 7 is an assembled perspective view of a heat exchanger of an exhaust heat recovery apparatus according to a second exemplary embodiment of the present invention.
Figure 8:
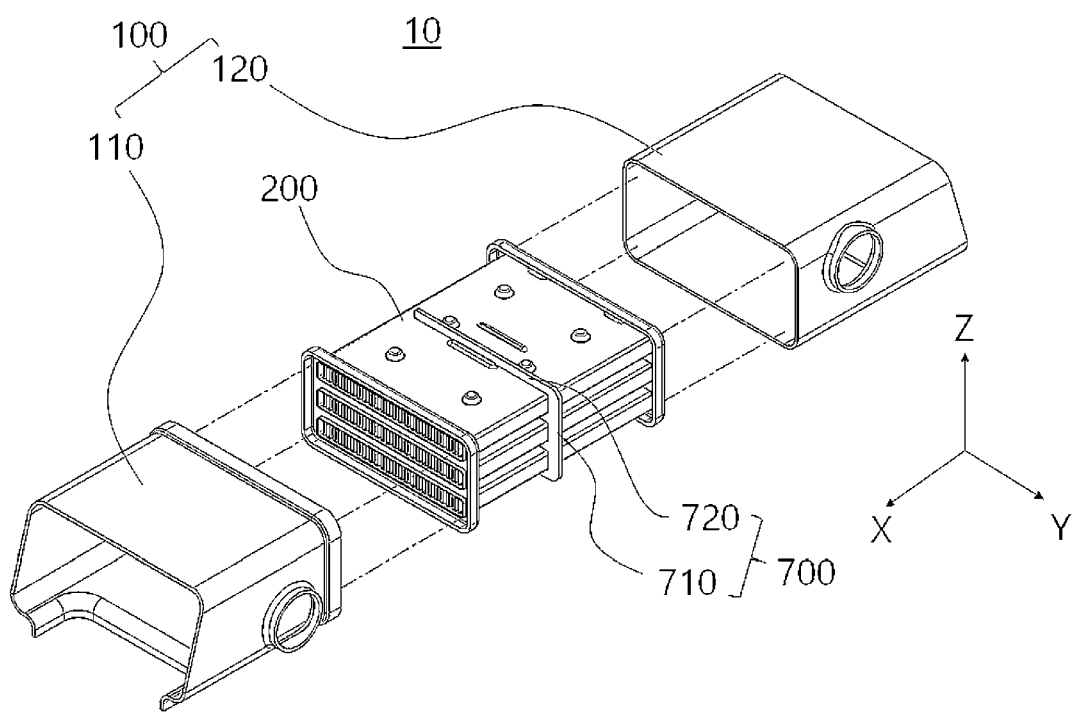
FIG. 8 is an exploded perspective view of the heat exchanger of the exhaust heat recovery apparatus according to the second exemplary embodiment of the present invention.

FIG. 7 illustrates an assembled state of the heat exchanger 10 of the exhaust heat recovery apparatus according to the second exemplary embodiment of the present invention, and FIG. 8 illustrates the heat exchanger 10 of the exhaust heat recovery apparatus according to the second exemplary embodiment of the present invention.

As illustrated in FIGS. 7 and 8, the housing 100 in the heat exchanger of the exhaust heat recovery apparatus according to the second exemplary embodiment of the present invention includes a first housing 110 and a second housing 120 that may be assembled together.

As illustrated in FIGS. 7 and 8, the first housing 110 has an inner end (directed to the second housing) that is wider than that of the second housing 120 (directed to the first housing) to insert the inner end of the second housing 120 partially into the inner end of the first housing 110.

Figure 9:
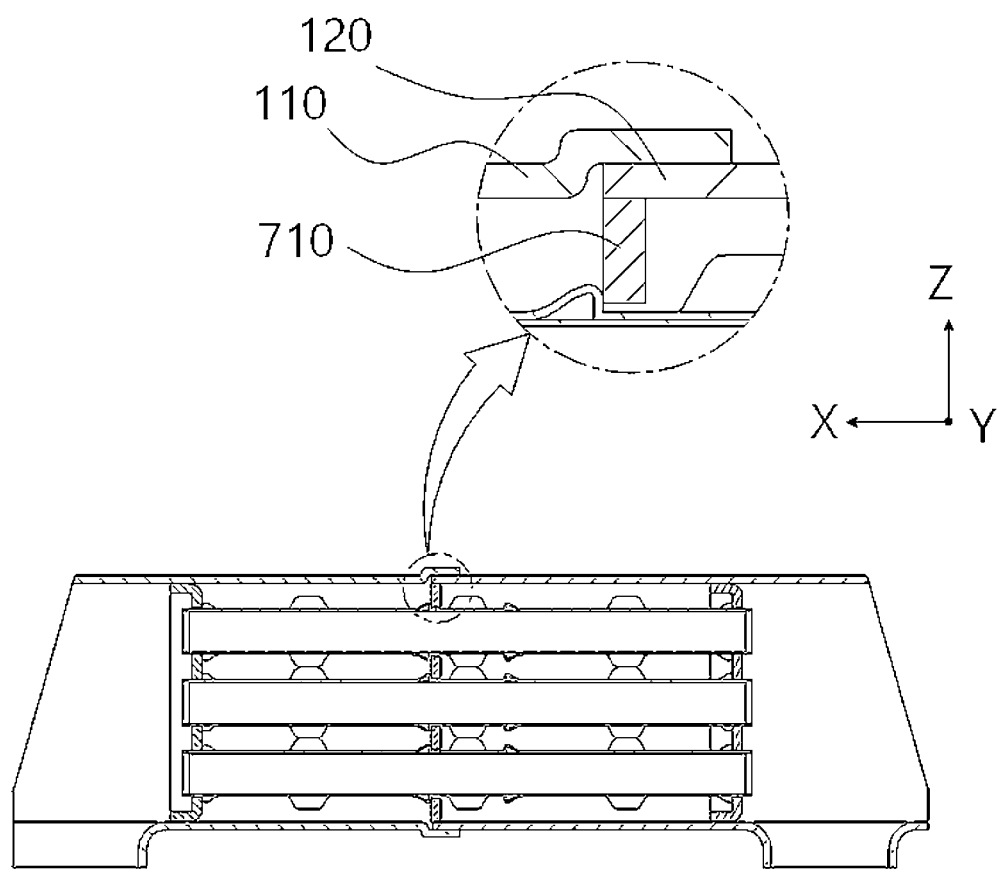
FIG. 9 is an assembled cross-sectional view of the heat exchanger of the exhaust heat recovery apparatus of FIG. 7 according to the second exemplary embodiment of the present invention.

FIG. 9 illustrates a longitudinal cross section of the heat exchanger of the exhaust heat recovery apparatus according to the second exemplary embodiment of the present invention illustrated in FIG. 7.

As illustrated in FIG. 9, when the first housing 110 and the second housing 120 are assembled together, an inner surface of the inner end of the first housing 110 is in contact with an outer surface of the inner end of the second housing 120 in a state where the inner end of the first housing 110 is located on the outermost side, and an inner surface of the inner end of the second housing 120 is in contact with the support portion 710, thereby securing a thickness of the center portion of the housing 100.

In the heat exchanger of the exhaust heat recovery apparatus according to the second exemplary embodiment of the present invention, the reason why the center portion of the housing 100 has a triple structure as described above is that there is a problem that when rapid external cooling occurs in a state where the heat exchanger overheats, the heat exchanger may be damaged due to deformation such as swelling. Therefore, the durability of the heat exchanger is improved by configuring the center portion of the heat exchanger in a triple-overlap structure.

Figure 10:
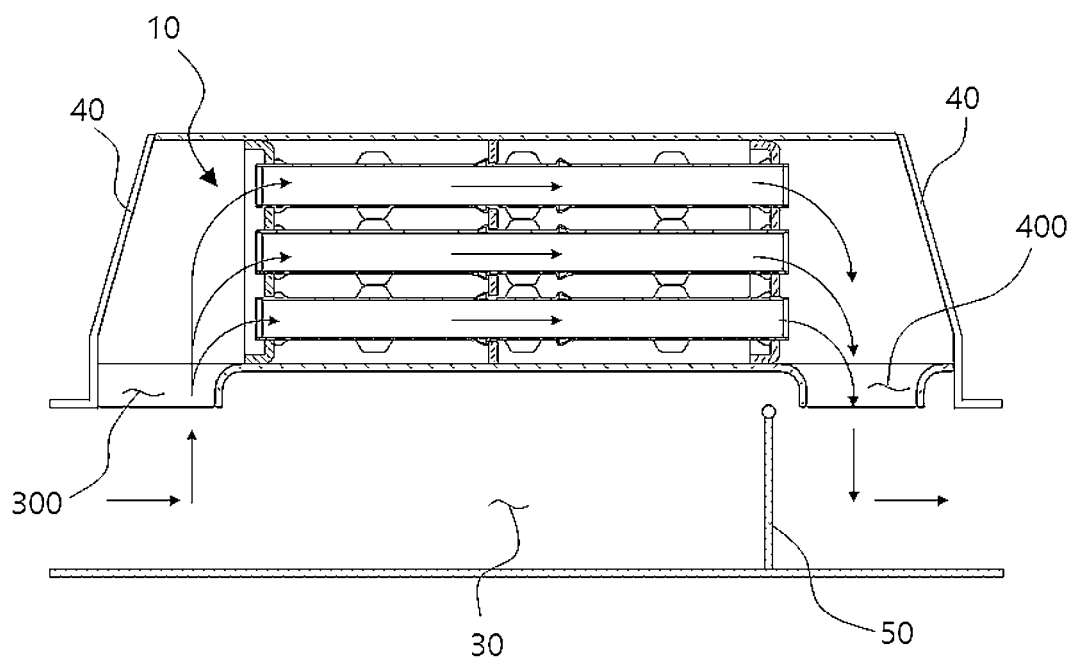
FIG. 10 is a schematic cross-sectional view of an exhaust heat recovery apparatus in an exhaust gas heat-exchange mode according to an exemplary embodiment of the present invention.
Figure 11:
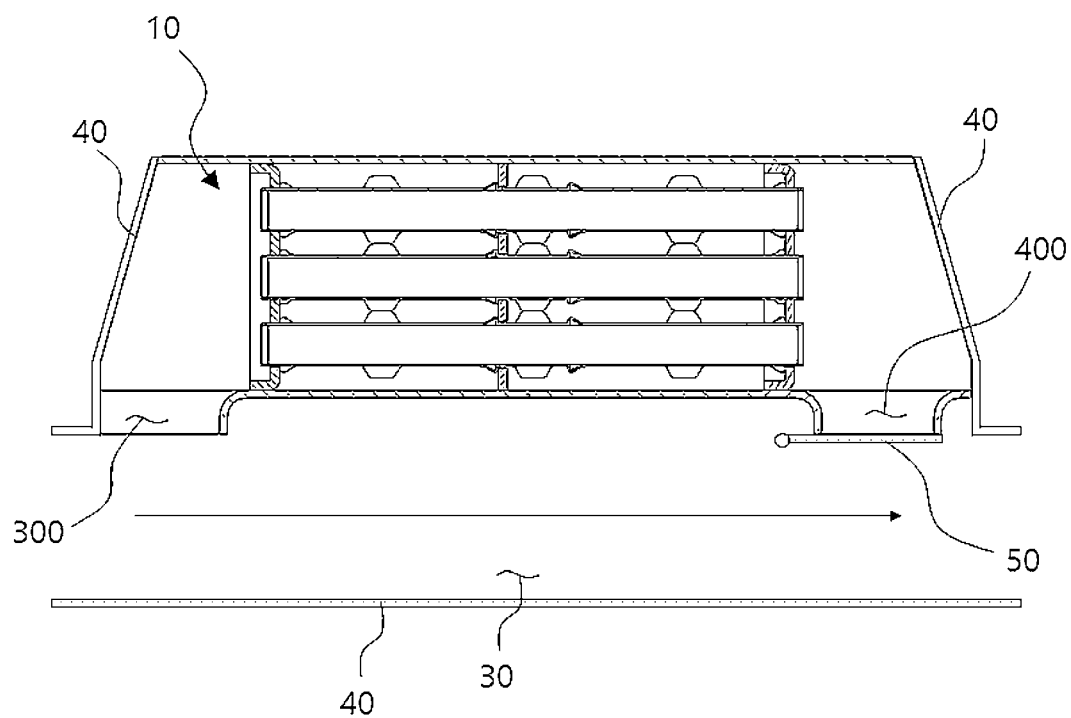
FIG. 11 is a schematic cross-sectional view of an exhaust heat recovery apparatus in a bypass mode according to an exemplary embodiment of the present invention.

FIGS. 10 and 11 each illustrate a partial cross section of the exhaust heat recovery apparatus including the heat exchanger described above for explaining its configuration that varies depending on an operation mode of the exhaust heat recovery apparatus.

As illustrated in FIG. 10, an exhaust heat recovery apparatus according to an exemplary embodiment of the present invention may include the heat exchanger 10 of the exhaust heat recovery apparatus, an outer housing 40, and an exhaust gas controller 50.

The outer housing 40 serves to guide the exhaust gas and to accommodate the heat exchanger 10 of the exhaust heat recovery apparatus therein as described above, and forms a separate exhaust gas flow path 30 connected in parallel with the flow path in the heat exchanger 10 of the exhaust heat recovery apparatus.

Referring to FIG. 10, the exhaust gas controller 50 is configured as a sort of valve to block one of the flow path in the heat exchanger 10 of the exhaust heat recovery apparatus and the exhaust gas flow path 30 according to the operation mode of the exhaust heat recovery apparatus, thereby controlling the flow of the exhaust gas.

FIG. 10 represents an exhaust gas heat-exchange mode, in which the exhaust gas controller 50 blocks the exhaust gas flow path 30 so that the exhaust gas may be introduced into the heat exchanger 10 of the exhaust heat recovery apparatus through the exhaust gas inlet 300 to exchange heat with the coolant and then discharged to the exhaust gas outlet 400.

FIG. 11 represents a bypass mode for controlling the exhaust gas not to be heat-exchanged, in which the exhaust gas controller 50 blocks the exhaust gas outlet 400 so that the exhaust gas may move along the exhaust gas flow path 30 rather than flowing into the heat exchanger 10 of the exhaust heat recovery apparatus. This is because, in winter, when an initial time of an engine operation has elapsed, the exhaust gas and the coolant do not need to exchange heat with each other and it is thus not required to use the above-described heat exchanger 10 for the exhaust heat recovery apparatus.

The present invention is not limited to the above-described exemplary embodiments, and may be applied in a wide range and variously modified without departing from the gist of the present invention claimed in the claims.

DESCRIPTION OF REFERENCE NUMERALS

10: heat exchanger for exhaust heat recovery apparatus
20: coolant flow path
30: exhaust gas flow path  40: outer housing
50: exhaust gas controller
100: housing
110: first housing  120: second housing
200: tube part  210: fin
211: first wave  212: second wave
220: connector
300: exhaust gas inlet  400: exhaust gas outlet
500: coolant inlet  600: coolant outlet
700: baffle
710: support portion  720: extension portion

The invention claimed is:

1. A heat exchanger of an exhaust heat recovery apparatus comprising:
    a housing extending in one direction, with both sides thereof being opened to allow exhaust gas to be introduced from one side thereof and discharged to the other side thereof;
    at least two tube parts spaced apart from each other at a predetermined distance in a height direction while being accommodated inside the housing to form a flow path in a direction in which the housing extends to allow the exhaust gas introduced from the one side of the housing to pass therethrough;
    an exhaust gas inlet formed in a lower portion of the one side of the housing;
    an exhaust gas outlet formed in a lower portion of the other side of the housing and having a smaller area than the exhaust gas inlet;
    a coolant inlet formed in a side surface of the housing to introduce coolant between the tube parts; and
    a coolant outlet formed in the side surface of the housing to discharge the coolant introduced between the tube parts,
    wherein one end of the exhaust gas inlet is opened and the exhaust gas outlet has an end portion formed at the other side thereof to be closed.

2. The heat exchanger of the exhaust heat recovery apparatus of claim 1, further comprising a baffle fixing the plurality of tube parts to be spaced apart from each other and extending a flow path for the coolant introduced through the coolant inlet and discharged through the coolant outlet.

3. The heat exchanger of the exhaust heat recovery apparatus of claim 2, wherein the baffle includes:
    a support portion extending in one direction to be disposed in the height direction of the housing; and
    a plurality of extension portions extending in a direction perpendicular to the direction in which the support portion extends, while being spaced apart from each other at a predetermined distance along the support portion, to be inserted into spaces between the tube parts.

4. The heat exchanger of the exhaust heat recovery apparatus of claim 1, wherein a parallel distance from the exhaust gas inlet to a tube part farthest away therefrom is no more than 1.5 times a one-side width of the exhaust gas inlet.

5. The heat exchanger of the exhaust heat recovery apparatus of claim 4, wherein the exhaust gas inlet has an area that is no less than 99% and no more than 105% of a sum of inlet end areas of the plurality of tube parts.

6. The heat exchanger of the exhaust heat recovery apparatus of claim 1, wherein the exhaust gas outlet has an area that is 70% or more of that of the exhaust gas inlet.

7. The heat exchanger of the exhaust heat recovery apparatus of claim 1, wherein the coolant inlet is formed at a lower position than the coolant outlet on the basis of the gravity direction.

8. The heat exchanger of the exhaust heat recovery apparatus of claim 1, wherein a coolant flow path formed by a space between the tube parts adjacent to each other and a coolant flow path formed by a space between the housing and the tube part are identical to each other in height.

9. The heat exchanger of the exhaust heat recovery apparatus of claim 8, wherein each of the coolant flow paths has a height that is no less than 95% and no more than 100% of a value obtained by dividing an inner diameter of the coolant inlet by a total number of coolant flow paths.

10. The heat exchanger of the exhaust heat recovery apparatus of claim 1, wherein each of the tube parts includes a plurality of fins spaced apart from each other at a predetermined distance in a width direction of the housing, with first waves curved in one direction and second waves curved in the opposite direction being repeatedly formed, while extending in the direction in which the housing extends and in the height direction.

11. The heat exchanger of the exhaust heat recovery apparatus of claim 10, wherein the number of repetitions of first waves and second waves is 13 to 15 per 100 mm in length of each of the fins.

12. The heat exchanger of the exhaust heat recovery apparatus of claim 10, wherein the fins extend to be 6 to 8 mm in the height direction.

13. The heat exchanger of the exhaust heat recovery apparatus of claim 10, wherein a parallel distance from end points of the first waves to end points of the second waves of another adjacent fin is 0.20 to 0.25 mm.

14. The heat exchanger of the exhaust heat recovery apparatus of claim 10, wherein the first waves have a curvature radius of 3.8 to 4.2 mm, and the second waves have a curvature radius of 2.5 to 2.9 mm.

15. The heat exchanger of the exhaust heat recovery apparatus of claim 3, wherein the housing includes a first housing and a second housing that are assembled together.

16. The heat exchanger of the exhaust heat recovery apparatus of claim 15, wherein the first housing and the second housing are assembled together by inserting an end of the second housing into an end of the first housing, and the support portion is located at a position where the ends of the first housing and the second housing overlap each other to contact an inner surface of the second housing.

17. An exhaust heat recovery apparatus comprising:
the heat exchanger of the exhaust heat recovery apparatus of claim 1;
an outer housing in which the heat exchanger of the exhaust heat recovery apparatus is accommodated; and
a valve installed inside the outer housing to control the exhaust gas to be introduced into or blocked from the heat exchanger of the exhaust heat recovery apparatus depending on an operation mode.

* * * * *